March 28, 1961 C. F. QUICK ET AL 2,976,748
TUMBLE DRILL JIG
Filed Aug. 10, 1959 3 Sheets-Sheet 1
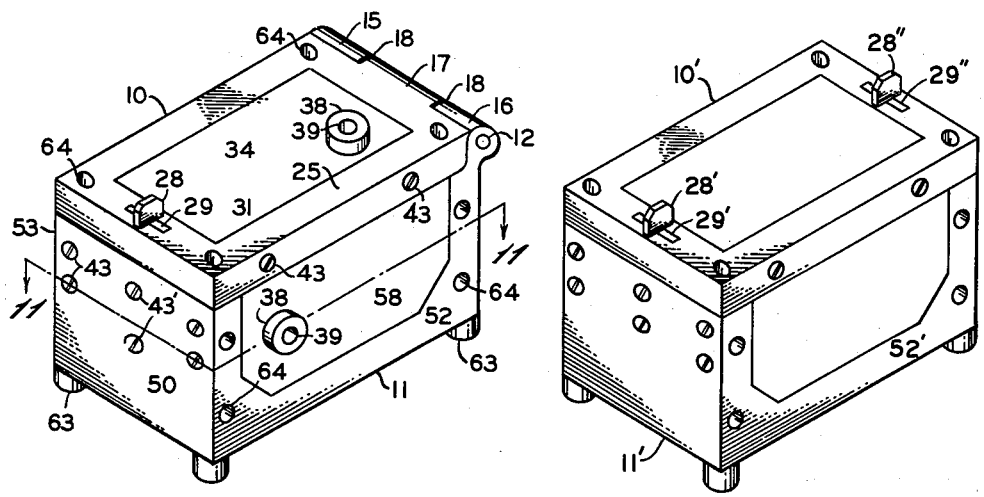
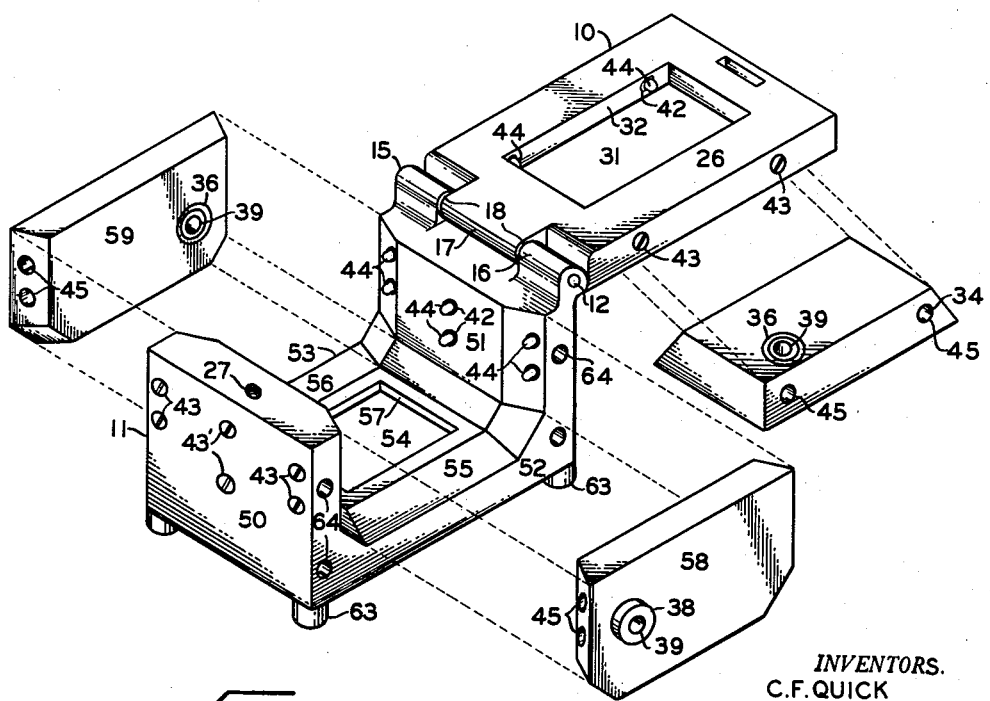
INVENTORS.
C.F. QUICK
L.B. RICE
BY George E. Pearson
ATTORNEY

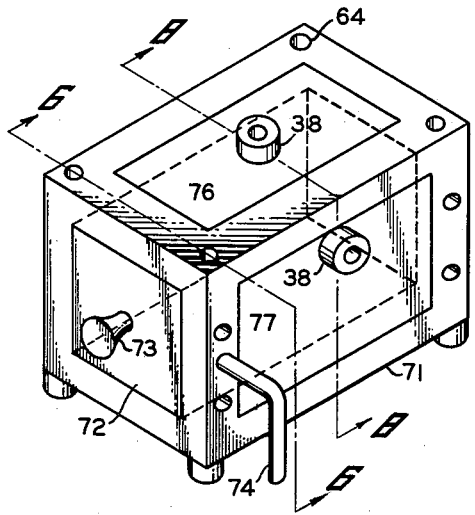
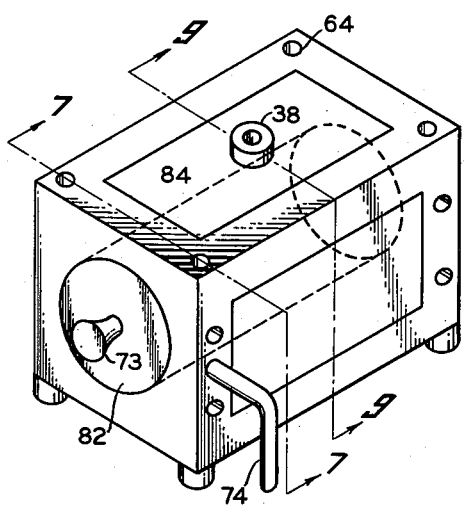
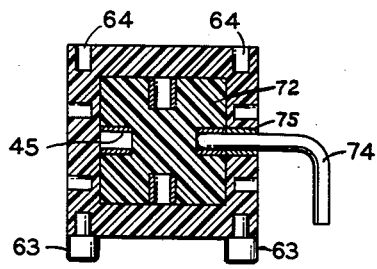
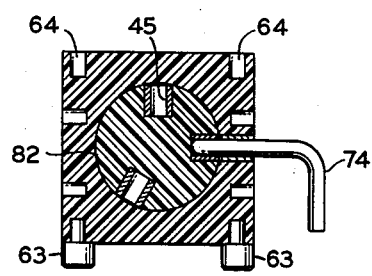
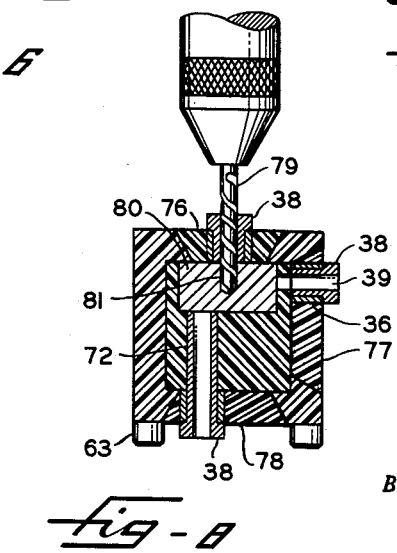

March 28, 1961

C. F. QUICK ET AL 2,976,748

TUMBLE DRILL JIG

Filed Aug. 10, 1959

INVENTORS.
C.F. QUICK
L.B. RICE

BY

*George E. Parsons*

ATTORNEY

United States Patent Office 2,976,748
Patented Mar. 28, 1961

2,976,748

TUMBLE DRILL JIG

Carl F. Quick and Leslie B. Rice, Chula Vista, Calif., assignors to Rohr Aircraft Corporation, Chula Vista, Calif., a corporation of California Filed Aug. 10, 1959, Ser. No. 832,788

15 Claims. (Cl. 77—62)

This invention relates generally to drill jigs of a type useful for holding a workpiece or part while one or more holes are drilled at predetermined positions therein.

This application is a continuation-in-part of our application Serial No. 731,228, filed April 28, 1958 for Drill Jig, which issued as Patent No. 2,898,785, dated August 11, 1959 wherein there is disclosed and claimed a pair of hand manipulated, hinged, windowed frames for receiving and supporting drill bushing and part-bearing inserts in a manner to present the drill bushing, or bushings as the case may be, in operative relation to the part which is to be drilled by a drill guided in the bushing. The inserts are made, used, and stored as mates, or matched sets, for use with a multiplicity of different parts, there being a pair of inserts for each part. At least one of each pair of inserts carries the bushings of which there may be one or more, and the other insert has provision for nesting the part therein. The mated pairs of inserts are thus interchangeably receivable in the hinged frame members of the jig for nesting, holding, and drilling a plurality of different parts selectively within the jig, each in relation to the proper array of drill bushings for drilling the part.

In accordance with the present invention, the jig principles and features disclosed in our application aforesaid are extended and applied to jigs of the so-called "Tumble Box Jig" type wherein a windowed box frame is adapted to receive a part-nesting insert in operative relation to one or more bushings supported in one or more inserts, in turn, mounted in one or more of the windowed sides or leafs of the box frame. The part-nesting insert may be inserted centrally within the box frame merely by dropping the same therewithin from the top and retaining the same within the frame as by pins or by means of a lid or cover which is hinged or otherwise secured at the top of the frame. Alternatively, the part-nesting insert and part carried thereby may comprise a drawer system adapted for sliding insert, rotary indexing, and withdrawal from the box frame, or the part-nesting insert may be mounted within one of the side windows of the box frame for drilling engagement with a drill selectively guided in one or more bushings supported in one or more inserts, in turn, mounted in one or more of the other sides of the box frame.

An object of the present invention is to provide a new and improved drill jig.

Another object is to provide an improved tumble drill jig having provision for mounting drill bushing-supporting and part-nesting inserts in mutually operative relation thereon.

Another object is to provide a new and improved tumble box drill jig having provision for mounting one or more mating pairs or matched sets of bushing-supporting and part-nesting inserts in mutually operative relation in one or more of the windowed sides or leafs of the jig frame.

Still another object is to provide a tumble box drill jig having provision for receiving a drawer type part-nesting insert in operative relation to bushings supported in the sides of the box frame.

Still a further object is to provide a drawer type tumble box drill jig having provision for indexing the drawer within the jig frame to present a nested part to different ones of an array of drill bushings supported on the frame.

Still other objects, features, and advantages of the present invention are those inherent in or to be implied from the novel construction, combination, and arrangement of parts as more fully disclosed in the following specification, reference being had to the accompanying drawings wherein:

Fig. 1 is a perspective view of a preferred embodiment of a tumble box drill jig constructed in accordance with the principles of the present invention and having a hinged lid or cover;

Fig. 2 is a view similar to Fig. 1 and illustrating an alternative method of fastening the lid to the jig frame;

Fig. 3 is an exploded view of the jig structure of Fig. 1, the bottom insert not being shown;

Fig. 4 is a view in perspective of a tumble box drill jig having a drawer type insert;

Fig. 5 is a view similar to Fig. 4 and illustrating a variation of the drawer configuration;

Fig. 6 is a sectional view taken along the lines 6—6 of Fig. 4;

Fig. 7 is a sectional view taken along the lines 7—7 of Fig. 5;

Fig. 8 is a sectional view as seen along the lines 8—8 of Fig. 6;

Fig. 6 is a view similar to Fig. 8 as viewed along the lines 9—9 of Fig. 5;

Figure 11:
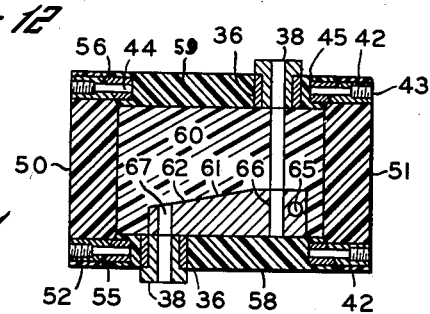
Fig. 11 is a sectional view taken along the lines 11—11 of Fig. 1.

Referring now to the drawings, and more particularly to Figs. 1, 3, and 11, the drill jig shown therein comprises an upper plastic frame 10 pivoted or hinged to a lower plastic frame 11 by a metal pivot pin 12, frame 11 having two integral lugs 15, 16 at one end and frame 10 having an integral projection 17 which fits between the lugs to receive pivot pin 12. Preferably a pair of metal washers 18 are disposed around pin 12 between the lugs 15, 16 and projections 17 to minimize friction and wear, each washer preferably being coated with a thin film of wax or grease (not shown). A threaded metal insert 27 is bonded to the plastic of frame 11 to receive the threaded end of a quarter turn lock screw 28 which passes through an elongated slot 29 in frame 10, the length of the head of screw 28 being somewhat less than that of slot 29.

Upper frame 10, near its center, has a vertical, generally rectangular opening 31 extending from face 25 to face 26 therethrough whose plastic sidewall 32 tapers inwardly, as shown. A generally rectangular insert 34 is adapted to enter opening 31 and seat against its marginal wall 32, as shown. Extending through insert 34 and bonded thereto when the plastic became set are a pair of metal sleeves 36 whose cylindrical walls are vertical and adapted to slidably receive the outer cylindrical wall of a drill bushing 38 preferably made of hard steel. Bushing 38 has the usual center hole 39 to receive a rotary drill and guide it against a workpiece, as hereinafter more fully disclosed.

To locate plastic insert 34 and secure it to frame 10, four interiorly threaded metal sleeves 42 extend through the sides of the frame and are surrounded by and bonded to the plastic of the frame. Each sleeve has extended therethrough a threaded screw or pin 43 whose inner end 44 is cylindrical and adapted to enter a short hollow insert 45 embedded in and bonded to the plastic of insert 34.

As disclosed in our copending application aforesaid, the lower frame 11 is constructed of the same materials as frame 10 and is of the same general construction and configuration, its plastic insert, however, being provided with a cavity for nesting the workpiece. Frames 10 and 11 also have mating integral handle portions for manual manipulation of the drill jig.

For the purposes of the tumble box drill jig of the present invention, frame 11 is provided with a generally U-shaped box-like configuration having front and back end walls 50 and 51, sides 52 and 53, a bottom 54, and an open top adapted to be closed by frame 10 which, for this purpose, serves as a hinged lid or cover. As disclosed in Fig. 2, the hinged connection between the cover frame 10' and box frame 11' may be eliminated and the cover 10' releasably secured to the frame 11' by employing a second quarter turn lock screw 28'' at the other end of the jig.

In a manner generally similar to cover 10, sides 52 and 53 and bottom 54 are windowed to provide inwardly tapered surfaces 55, 56, and 57 respectively. Windowed surfaces 55 and 56 are adapted to receive and seat inserts 58 and 59 respectively, these being shaped generally similar to cover insert 34. A similar insert, not shown, understandably seats in the bottom windowed surface 57, and it further will be understood that end walls 50 and 51 may also be windowed and provided with inserts whenever this is necessary or desired to obtain a particular hole pattern in a part or workpiece to be drilled in the jig.

As best seen in Figs. 1, 3, and 11, side inserts 58 and 59, in the manner of cover insert 34, carry sleeves 36 for receiving bushings 38, and the side inserts similarly are retained in their seated positions on the jig by screws 43, received in threaded sleeves 42 embedded in the plastic frames 11, and having tips 44 which are received in the sleeves 45 embedded in the plastic of the inserts.

In the operation of the tumble box drill jig as thus far described, a part-nesting insert 60, Fig. 11, having a cavity 61 nesting a part 62, is dropped into the box jig frame 11 from the open top therein and the cover 10, or 10' as the case may be, closed and secured by the lock screw 28, or screws as the case may be. Jig 11 is supported on shouldered pins 63 which serve as jig feet, the shanks of these pins being received in suitable openings in the jig frames 10 and 11 such as disclosed at 64. Whenever desired or necessary, openings 64 may be provided by metal inserts embedded in the plastic of the frames.

Assuming now that a drill is rotated and lowered in the drill guide opening 39 of bushing 38 in cover insert 34, a hole 65, Fig. 11, will be drilled in workpiece 62. Following this, jig feet 63 may now be placed in openings 64 in side 52 of jig frame 11 and the jig tumbled so as to rest on pins 63 in this position as may be seen in Fig. 11. A drill now rotated and lowered in bushing 38 mounted in side insert 59 will drill a hole 66 in workpiece 62. Similarly, jig feet 63 placed on side 53 of jig frame 11, and the jig tumbled to rest on this side, will place the same in readiness to receive a drill rotated and lowered in bushing 38 mounted in side insert 58, to thus form a hole 67 in the workpiece.

For the purpose of thus drilling holes 65, 66, and 67 in workpiece 62, part-nesting insert 60 together with side inserts 58 and 59 and top or cover insert 34 constitute a matched set which will always be used together with part 62 in performing the aforedescribed drilling operations thereon, and when not so used, will be kept together in storage until called upon to drill another part 62. It will also be understood that other sets of inserts receivable in jig frames 10 and 11 may similarly be employed for different parts and each insert provided with one or more drill bushings in accordance with the drill hole pattern required to be formed in a particular part, the various sets or combinations of inserts required for different parts being used together in the jig or separately stored as matched sets for future use in the jig.

Figure 12:
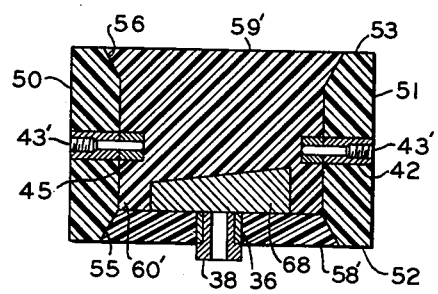
Fig. 12 is a view similar to Fig. 11 and illustrating a modified form of insert construction wherein the side and central inserts are formed as a unitary structure.

In Fig. 12 there is disclosed an arrangement in which the part-nesting insert 60' for nesting workpiece 68 is formed integrally with side insert 59'. In this case, locking pins 43' serve to retain the part-nesting insert in position within the box frame 11 and cover frame 10 therefore is not required.

Pins 43' may have an additional function as will presently appear in the discussion of the construction of the drill jig as thus far described. Frames 10 and 11 and their respective inserts are cast from a suitable plastic of a thermosetting or resilient nature and with or without a suitable filler such as glass fibers, steel wool, and the like, and the casting may be by several methods including injection or compression molding. While plastics are preferred, other materials such as light weight metals may be employed.

The cover and box frames 10 and 11 preferably are formed in a single casting operation, using a suitable separator plate between the two. The top, bottom, end, and side inserts may be cast around a sample or master part nested in an insert 60 supported by pins 43', a suitable parting agent being employed, and the inserts being cast to the inside dimensions of the voids or windows in the drill jig walls or leafs. The hole pattern in the master part may be picked up by a plurality of pins and plastic grip bushings or sleeves 36 which become an integral part of the inserts, and the inserts thus formed will fit all drill jigs cast from the same dimensional mold. All threaded holes may either be cast directly in the plastic or located by means of threaded inserts cast and embedded in the plastic, thus affording ease of location of clamp screws 28, jig feet or pins 63, threaded sleeves 42, and apertured inserts 45, and the like.

Referring now to Figs. 4, 6, and 8 there is disclosed a drawer type tumble drill jig having generally the same configuration as that heretofore described with the exception that an end of the jig frame 71 is open to provide for insertion of a drawer insert 72 having a handle 73. Insert 72 is also provided with metal inserts 43, Fig. 6, for receiving an indexing pin 74 slidably mounted in a sleeved insert 75 embedded in the jig frame. Pin 74 is thus adapted to hold drawer insert 72 in position within the jig 71 in any one of the four possible positions of rotation of the drawer within the jig.

Bushings 38 carried by top, side, and bottom inserts 76, 77, and 78 as best seen in Fig. 8, present a drill 79 in operative drilling engagement to part 80 nested in insert 72. By reason of the indexing arrangement, it will be understood that the part 80, by rotation of its insert-support 72 within the jig, may be presented in different orientations with respect to the bushings in the same insert. For example, bushing 38 in side insert 77 will form a second hole in workpiece 80 parallel to hole 81 being formed therein when insert is rotated 90° clockwise as viewed in Fig. 8.

Figure 9:
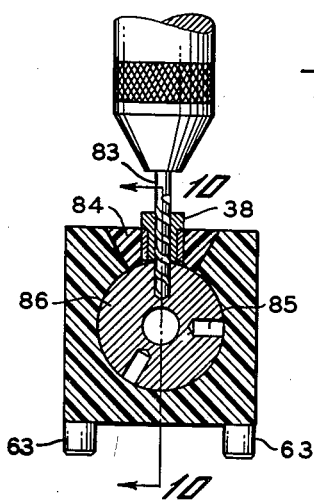
Figure 10:
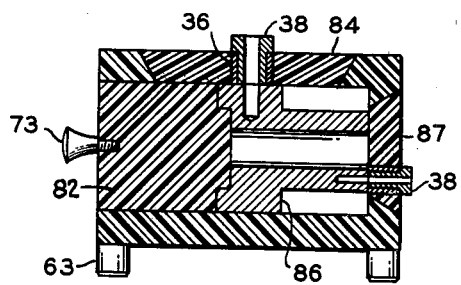
Fig. 10 is a sectional view taken along the lines 10—10 of Fig. 9.

Figs. 5, 7, 9, and 10 disclose a drawer type tumble jig wherein the drawer insert 82 is cylindrical, the indexing system 43, 74 otherwise being the same. As best seen in Figs. 5, 9, and 10, a drill 83 presented by bushing 38 mounted in top insert 84, is well adapted to accurately space holes 85 circumferentially in part 86 mounted in insert 82 in accordance with the indexing-spacing shown in Fig. 7, and additionally, to drill circumferentially spaced holes 87 endwise of the part by means of drill guide bushing 38 mounted in end insert 88 of the jig.

The invention may be embodied in other forms or carried out in other ways without departing from the spirit or essential characteristics thereof. The embodiments of the invention as hereinbefore disclosed therefore are to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. In a drill jig, in combination, a drill bushing-supporting insert, a part-nesting insert, and a jig frame for receiving and holding said inserts in operative relation for drilling of the part by a drill guided in the bushing.

2. In a drill jig, in combination, an insert having at least one drill bushing mounted therein, an insert having provision for nesting a part to be drilled therein, and a jig frame for receiving and holding said inserts in mutual operative relation for drilling of said part by a drill guided in said bushing.

3. In a drill jig, in combination, an insert having at least one drill bushing mounted therein, an insert having provision for nesting at least one part to be drilled, a jig frame for receiving said inserts in mutual operative relation for drilling of said part by a drill guided in said bushing, and means on said frame and engageable with said inserts for holding the same in said operative relation.

4. In a drill jig as claimed in claim 2, said jig frame comprising a frame member individual to said insert for mounting said bushing and a second frame member individual to said insert for nesting said part.

5. In a drill jig combination as claimed in claim 4 and further comprising means for holding said frame members together.

6. In a drill jig combination as claimed in claim 4 and further comprising means for pivotally connecting said frame members together at one end and means for clamping said frame members together at the opposite end.

7. In a tumble drill jig, in combination, a hollow box-like jig frame having at least one windowed wall, a part-bearing insert receivable within said frame, and a drill bushing-bearing insert receivable in seated relation within said windowed wall and in operative relation to said part-bearing insert for drilling of the part by a drill guided in the bushing.

8. In a tumble drill jig, in combination, a box-like jig frame, an insert having provision for nesting a part to be drilled therein and receivable interiorly of said frame, and an insert having at least one drill bushing carried thereby and adapted for mounting exteriorly of said frame in operative relation to said part-nesting insert for drilling of the part by a drill guided in the bushing.

9. In a tumble drill jig as claimed in claim 8 and further comprising a cover frame for said box-like frame, said cover frame having a window for receiving and mounting said bushing carrying insert.

10. In a tumble drill jig as claimed in claim 8, said box-like frame having at least one window for receiving and mounting said part-nesting insert and at least one window for receiving and mounting said bushing carrying insert therein.

11. In a tumble drill jig as claimed in claim 8, said box-like frame having at least one window for receiving and mounting said bushing carrying insert therein.

12. In a tumble drill jig as claimed in claim 8, said box-like jig frame having a drawer-receiving cavity extending from an outer face interiorly of said frame, said part-nesting insert and a part to be drilled thereon being receivable as a unit into said drawer-receiving cavity and together therewith constituting a drawer system for said jig, and said box-like frame having at least one window for receiving and mounting said bushing carrying insert therein.

13. In a tumble drill jig as claimed in claim 12 and further comprising means for indexing said part-nesting insert and part as a unit within said cavity in said box-like frame to present said part in different drilling orientations in accordance with a predetermined hole pattern desired in the part.

14. In a tumble drill jig as claimed in claim 8, said box-like frame having a first window for receiving and mounting said bushing carrying insert therein, a third insert formed integrally with said part-nesting insert, and said box-like frame having a second window for receiving and mounting said third insert therein.

15. In a drill jig as claimed in claim 3, said inserts and frame being cast of plastic and said holding means comprising metal inserts embedded in and bonded to the plastic.

References Cited in the file of this patent

UNITED STATES PATENTS 2,898,785    Quick et al. _____ Aug. 11, 1959